United States Patent
Nakagawa

(10) Patent No.: US 9,699,333 B2
(45) Date of Patent: Jul. 4, 2017

(54) IMAGE FORMING SYSTEM INCLUDING A PORTABLE TERMINAL DEVICE

(71) Applicant: KYOCERA Document Solutions Inc., Osaka-shi, Osaka (JP)

(72) Inventor: Hiroshi Nakagawa, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 0 days.

(21) Appl. No.: 15/163,718

(22) Filed: May 25, 2016

(65) Prior Publication Data

US 2016/0352937 A1 Dec. 1, 2016

(30) Foreign Application Priority Data

May 29, 2015 (JP) ................................. 2015-110280

(51) Int. Cl.
*H04N 1/00* (2006.01)
*G06F 3/16* (2006.01)

(52) U.S. Cl.
CPC ......... *H04N 1/00403* (2013.01); *G06F 3/167* (2013.01); *H04N 1/00307* (2013.01); *H04N 1/00411* (2013.01); *H04N 2201/0094* (2013.01)

(58) Field of Classification Search
CPC .............................................. H04N 1/00403
USPC ....................................................... 358/1.15
See application file for complete search history.

(56) References Cited

U.S. PATENT DOCUMENTS

| 6,049,328 | A | * | 4/2000 | Vanderheiden | ........ | G09B 21/00 |
| | | | | | | 341/21 |
| 2002/0054345 | A1* | | 5/2002 | Tomida | ................. | G06F 3/1206 |
| | | | | | | 358/1.15 |
| 2014/0040989 | A1* | | 2/2014 | Davis | ...................... | H04L 63/08 |
| | | | | | | 726/4 |
| 2016/0246498 | A1* | | 8/2016 | Rav-Noy | ............ | G06F 3/04883 |

FOREIGN PATENT DOCUMENTS

| JP | H08314687 A | 11/1996 |
| JP | 2003348283 A | 12/2003 |
| JP | 2007086944 A | 4/2007 |

* cited by examiner

*Primary Examiner* — Jacky X Zheng

(57) ABSTRACT

An image forming system including an image forming device and a portable terminal device communicably connectable to the image forming device is disclosed. An image forming device includes a touch panel, a detector section, a voice information generator section, and a transmitter section. The touch panel displays a softkey. The detector section detects a pressed position in the touch panel. The voice information generator section generates voice information concerning the position detected by the detector section and the softkey. The transmitter section transmits the voice information to the portable terminal device. The portable terminal device includes a receiver section, a voice data creator section, and a voice outputting section. The receiver section receives the voice information transmitted from the transmitter section. The voice data creator section creates voice data to be output based on the voice information. The voice outputting section outputs a voice based on the voice data.

2 Claims, 6 Drawing Sheets

IMAGE FORMING SYSTEM INCLUDING A PORTABLE TERMINAL DEVICE

INCORPORATION BY REFERENCE

The disclosure of Japanese application No. 2015-110280 filed on May 29, 2015 including specification, drawings, and abstract thereof is herein incorporated by reference in its entirety.

BACKGROUND

This disclosure relates to an image forming system.

In image forming devices represented by a multifunction peripheral and the like, an image of a manuscript is read by an image reader, a photo conductor, which is disposed in an image forming section, is irradiated with light, and then an electrostatic latent image is formed on the photo conductor based on the image read by the image forming section. Then, a charged developer is supplied on the formed electrostatic latent image to form a visible image, the visible image is transferred and fixed on a sheet of paper, and then the sheet of paper is discharged out of the device.

The image forming device receives a request for image formation and the like from a touch panel or hard keys provided on an operation section. A user requests image formation by inputting conditions of the image formation and the like through a touch panel and hard keys. The image forming device performs the requested image formation.

Some techniques about touch panels to input the contents of operations have been already disclosed.

SUMMARY

An image forming system according to the present disclosure includes an image forming device equipped with an image forming section to form an image, and a portable terminal device that is communicably connectable to the image forming device. An image forming device includes a touch panel, a detector section, a voice information generator section, and a transmitter section. The touch panel displays a softkey. The detector section detects a pressed position in the touch panel displaying the softkey. The voice information generator section generates a voice information concerning the position detected by the detector section and the softkey. The transmitter section transmits the voice information generated by the voice information generator section to the portable terminal device. The portable terminal device includes a receiver section, a voice data creator section, and a voice outputting section. The receiver section receives the voice information transmitted from the transmitter section. The voice data creator section creates voice data to be output based on the voice information received by the receiver section. The voice outputting section outputs a voice based on the voice data that is created by the voice data creator section.

DETAILED DESCRIPTION

Figure 1:
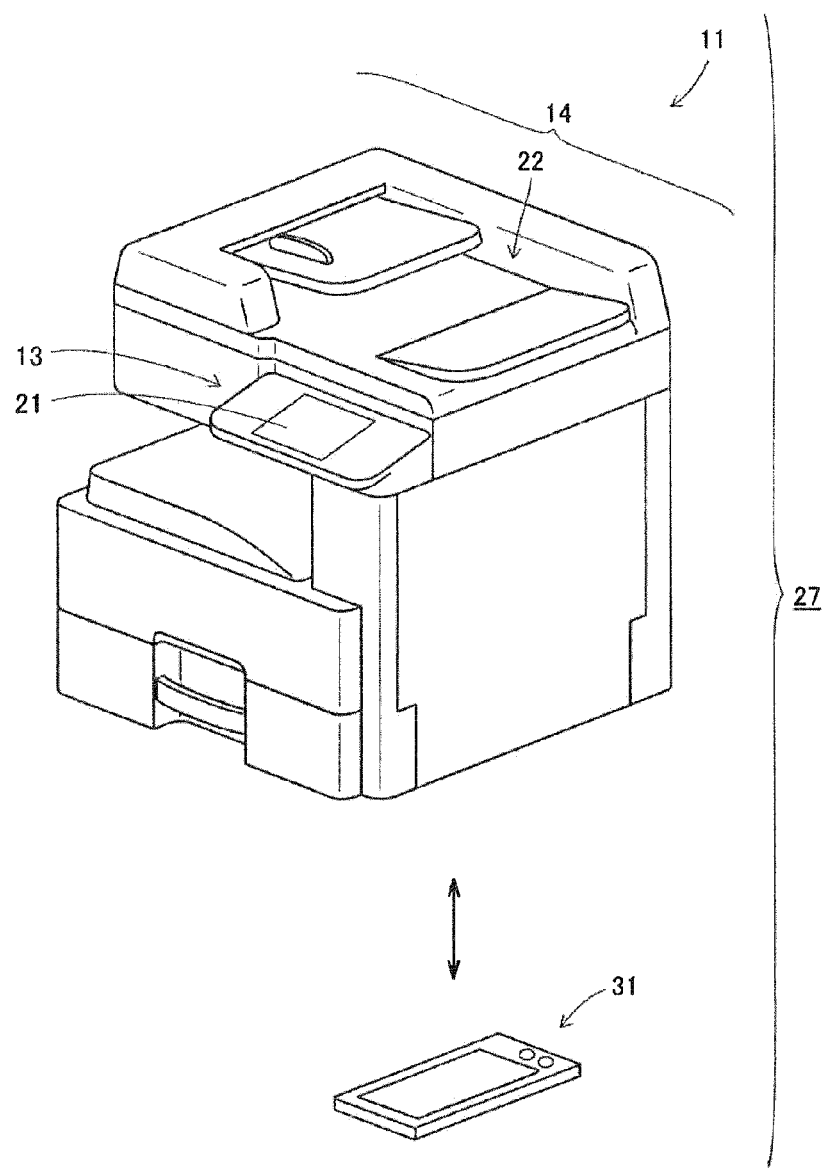
FIG. 1 is a schematic view illustrating the appearance of an image forming system according to one embodiment of the present disclosure.
Figure 2:
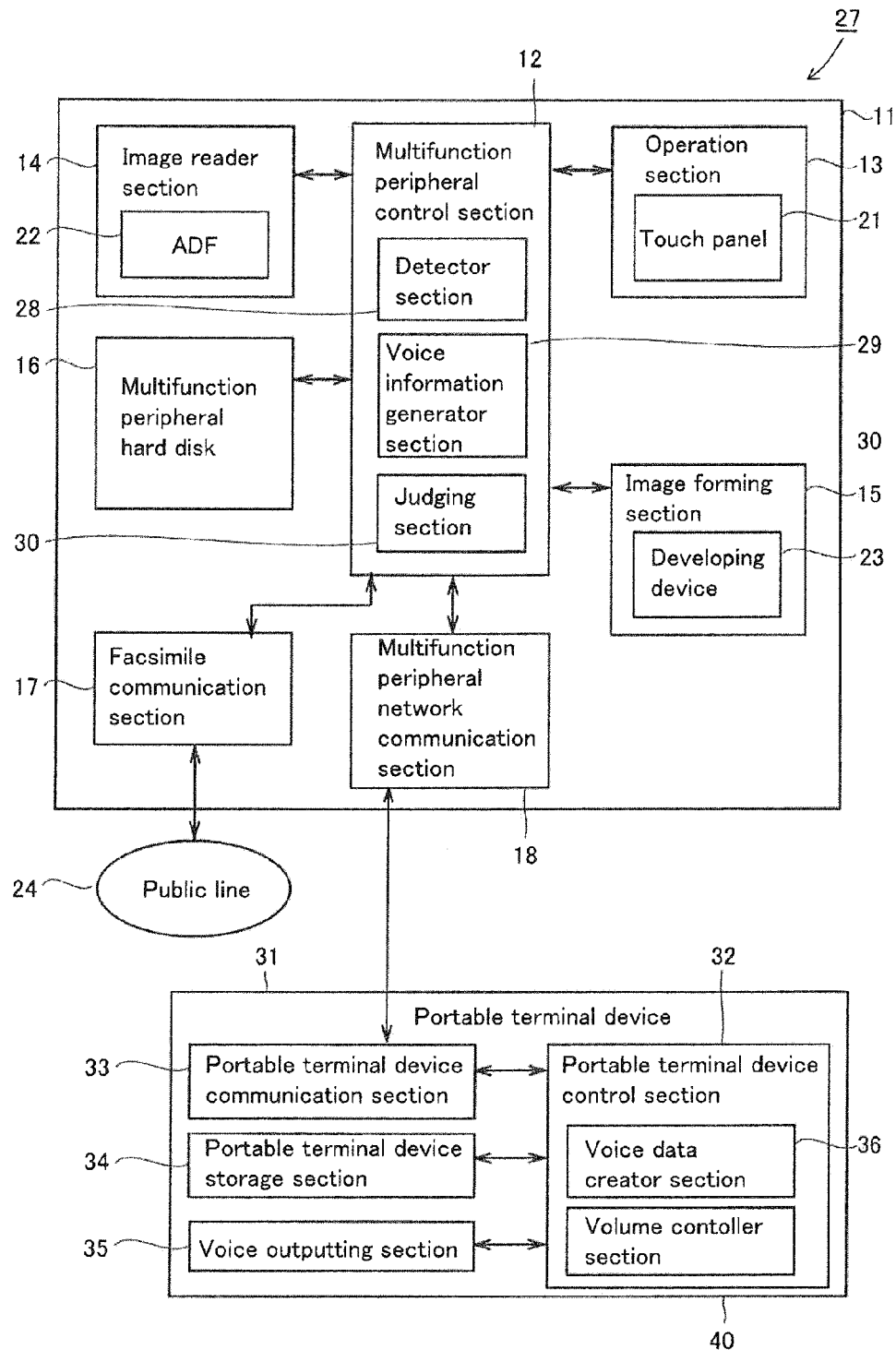
FIG. 2 is a block diagram illustrating the constitution of the image forming system according to one embodiment of the present disclosure.

Hereinafter, a preferred embodiment of this disclosure is described. FIG. 1 is a schematic view illustrating the appearance of the image forming system according to one embodiment of the present disclosure. FIG. 2 is a block diagram illustrating the constitution of the image forming system according to one embodiment of the present disclosure.

Referring to FIGS. 1 and 2, an image forming system 27 according to one embodiment of the present disclosure includes a multifunction peripheral 11, and a portable terminal device 31 that is connectable to the multifunction peripheral 11. Other computers or other multifunction peripherals may be connected to the multifunction peripheral 11.

The multifunction peripheral 11 included in the image forming system 27 according to one embodiment of this disclosure includes a multifunction peripheral control section 12, an operation section 13, an image reader section 14, an image forming section 15, a multifunction peripheral hard disk 16 as a storage section, a facsimile communication section 17, and a multifunction peripheral network communication section 18 that establishes a connection with the portable terminal device 31.

The multifunction peripheral control section 12 controls the entire multifunction peripheral 11. The operation section 13 accepts an input of a condition for image forming, such as the number or gradation of print copies, or a request for switching on/off of the power. The image reader section 14 includes an ADF (Auto Document Feeder) 22 as a manuscript transporter conveying a manuscript from the setting position to the reading position. The image reader section 14 reads an image of a manuscript set on an ADF 22 or a mounting table which is not illustrated in the drawings. The image forming section 15 includes a developing device 23 to form a visible image using a toner. The image forming section 15 forms an image on the conveyed sheet of paper based on image data read by the image reader section 14 or transmitted from the connected portable terminal device 31. The multifunction peripheral hard disk 16 stores transmitted image data, input image forming conditions, and the like. The facsimile communication section 17 is connected to a public line 24, and performs facsimile transmission and facsimile reception.

Although the multifunction peripheral 11 includes a DRAM (Dynamic Random Access Memory) which writes and reads image data and the like, an illustration and a description thereof are omitted. The arrows in FIG. 2 indicate the flow of control signals and data relating to the control and images.

The multifunction peripheral 11 operates as a copying machine by forming an image based on image data of a manuscript read by the image reader section 14 in the image forming section 15. Also, the multifunctional peripheral 11 operates as a printer by forming an image in the image forming section 15 based on image data transmitted from the connected portable terminal device 31 or computers (not illustrated) through the multifunctional peripheral network interface section 18, and then printing an image on a sheet of paper. That is, the image forming section 15 operates as a print section that prints a requested image. The multifunctional peripheral 11 operates as a facsimile device by forming an image in the image forming unit 15 through the DRAM based on image data transmitted from the public line 24 through the facsimile communication section 17, or by transmitting image data of a manuscript read by the image reader section 14 to the public line 24 through the facsimile communication section 17. Thus, the multifunctional peripheral 11 has a plurality of functions relating to image processing, such as a copying function, a printer function, and a facsimile function. Furthermore, the multifunctional peripheral 11 has a function which allows detailed settings of each function.

Next, the constitution of the operation section 13 is described further in detail. The operation section 13 includes a touch panel 21 that displays information that is transmitted from the side of the multifunction peripheral 11, or the contents input by a user. The touch panel 21 in the operation section 13 receives, when it is pressed with a finger of a user, an input of conditions for image formation, selection of a function, and the like. The operation section 13 is not equipped with any hard keys such as so-called numeric keypads, and the like.

Figure 3:
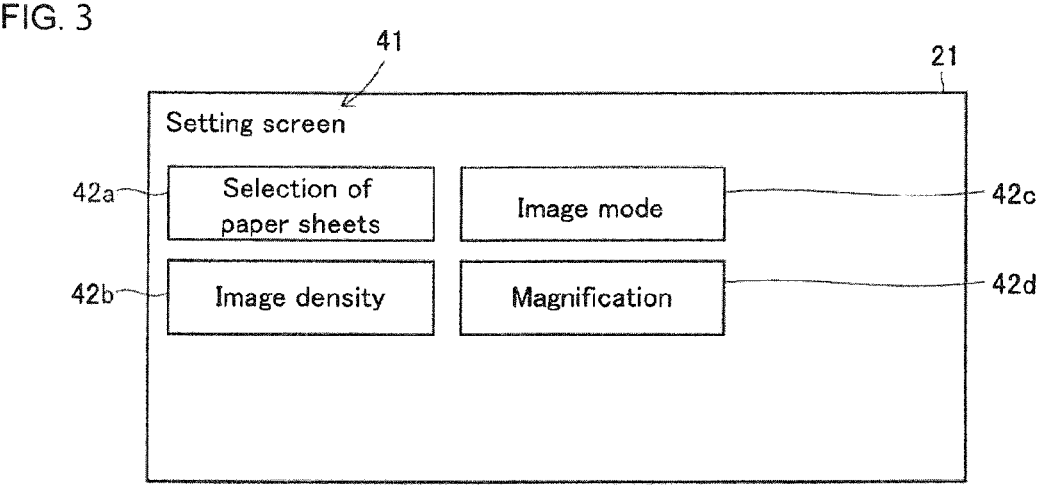
FIG. 3 is an external view illustrating a touch panel.

FIG. 3 is an external view illustrating the touch panel 21. Referring to FIGS. 1, 2, and 3, the touch panel 21 displays a message 41 with "Setting screen", a softkey 42a on which the text of "Selection of paper sheets" is displayed, a softkey 42b on which the text of "Image density" is displayed, a softkey 42c on which the text of "Image mode" is displayed, and a softkey 42d on which the text of "Magnification" is displayed. Pressing each of softkeys 42a to 42d allows an input of conditions for image formation corresponding to the displayed contents.

The multifunction peripheral control section 12 includes a detector section 28 that detects a pressed position in the softkeys 42a to 42d, a voice information generator section 29 that generates voice information concerning the position detected by the detector section 28, and a judging section 30 to judge whether or not the pressed key in the softkeys 42a to 42d involves secret information. Details of these are described below.

The portable terminal device 31 in the image forming system 27 according to one embodiment of this disclosure includes a portable terminal device control section 32 that controls the entire portable terminal device 31, a portable terminal device communication section 33 that establishes a connection with the multifunction peripheral 11 to transmit and receive information, a portable terminal device storage section 34 as a storage section that stores data or programs, and a voice outputting section 35 that outputs a voice from the portable terminal device 31 using the voice data. The portable terminal device control section 32 includes a voice data creator section 36 that creates voice data based on the voice information received from the multifunction peripheral 11, and a volume controller section 40 that controls the volume of a voice output from the voice outputting section 35.

Figure 4:
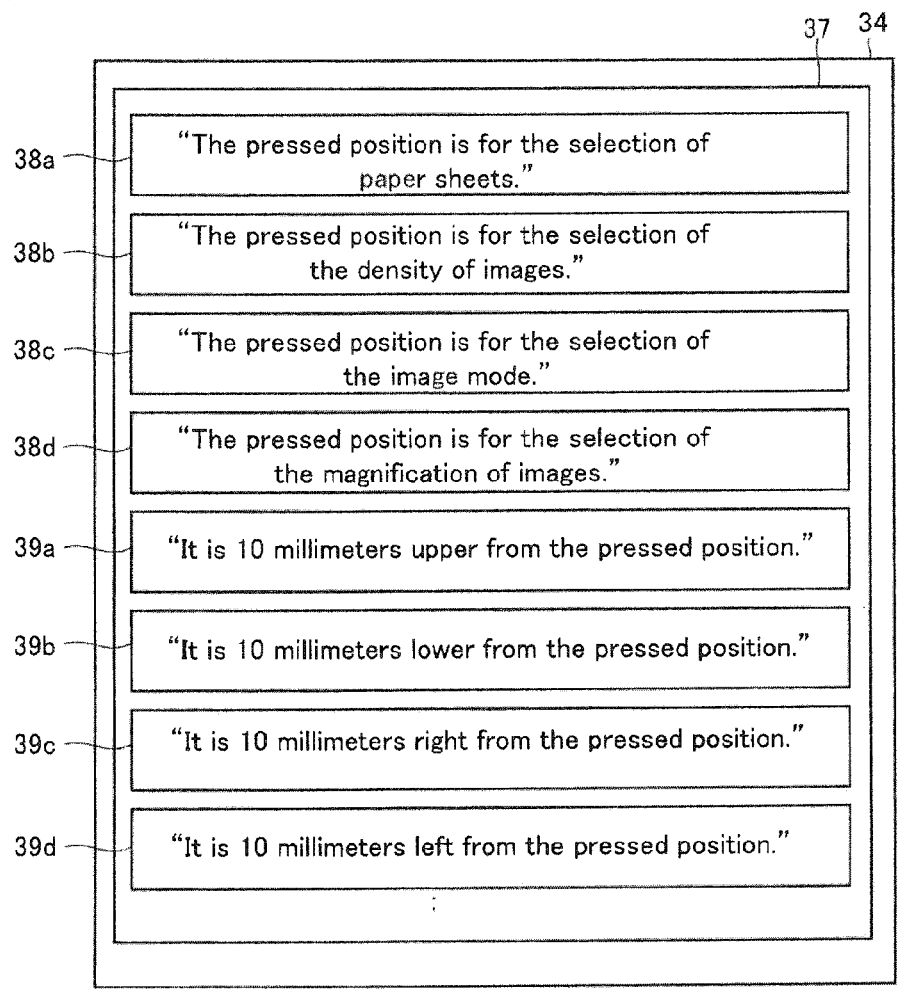
FIG. 4 is a conceptual diagram illustrating data that is stored in the portable terminal device storage section.

FIG. 4 is a conceptual diagram illustrating data that is stored in the portable terminal device storage section 34. Referring to FIG. 4, data of a plurality of voice patterns are stored in a storage area 37 in the portable terminal device storage section 34. Specifically, the storage area 37 stores data 38a including a voice pattern of "The pressed position is for the selection of paper", data 38b including a voice pattern of "The pressed position is for the selection of the density of images", data 38c including a voice pattern of "The pressed position is for the selection of the image mode", and data 38d including a voice pattern of "The pressed position is for the selection of the magnification of images." The storage area 37 also stores data 39a including a voice pattern of "It is 10 millimeters upper from the pressed position", data 39b including a voice pattern of "It is 10 millimeters lower from the pressed position", data 39c including a voice pattern of "It is 10 millimeters right from the pressed position", and data 39d including a voice pattern of "It is 10 millimeters left from the pressed position." The voice data creator section 36 can create voice data by, for example, combining these voice patterns. Note that the voice data creator section 36 can create other voice data.

Figure 5:
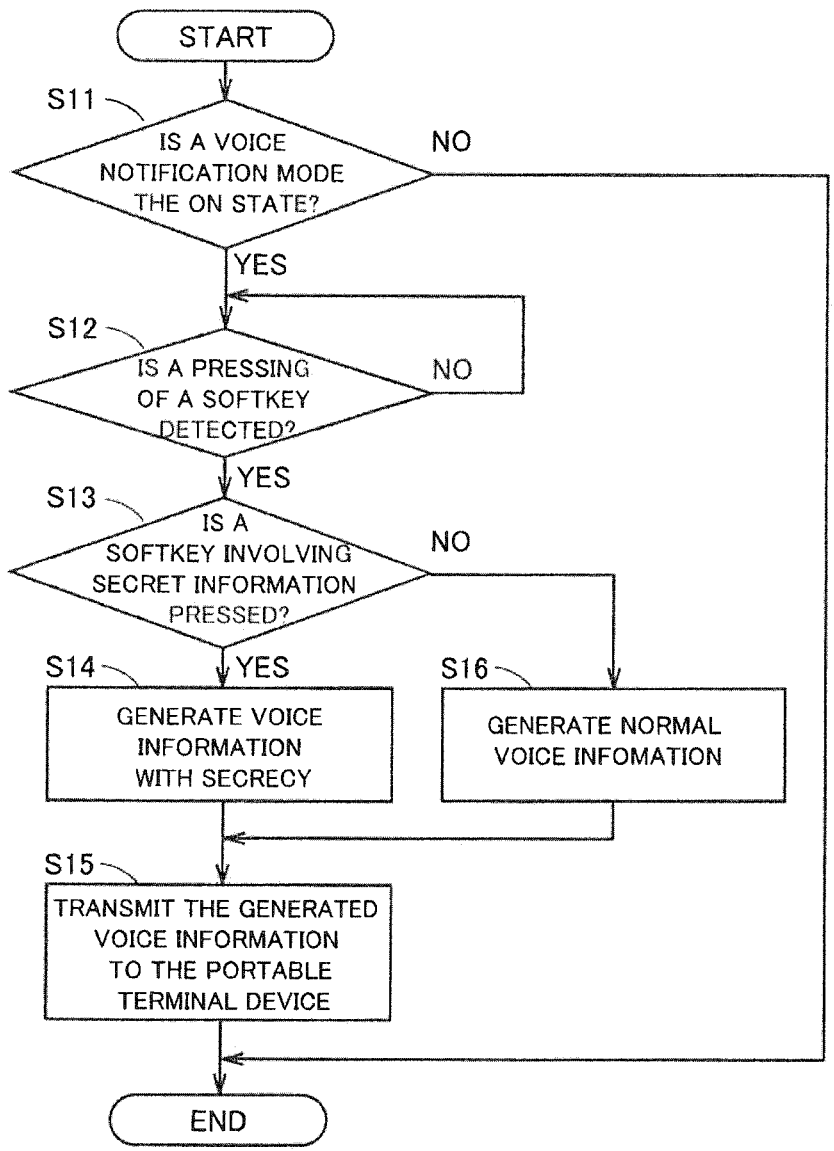
FIG. 5 is a flow chart illustrating a processing flow on the side of a multifunction peripheral when a user inputs a condition for image formation from the touch panel.

Then, a case where a user inputs a condition of image formation from the touch panel 21 using this image forming system 27 is described. FIG. 5 is a flow chart illustrating a processing flow on the side of the multifunction peripheral 11 when a user inputs a condition for image formation from the touch panel 21.

Referring to FIG. 5, the user goes to the place where multifunction peripheral 11 is installed, and presses a position in the touch panel 21. Then, if a voice notification mode is the ON state (YES in the step S11 in FIG. 5. Hereinafter, "the step" is omitted), the multifunction peripheral control section 12 detects a pressing of the touch panel 21 (YES in S12).

Then, whether or not the pressed key in the softkeys 42a-42d p is, for example, a key involving secret information such as passwords and code numbers is judged (S13). If the judging section 30 judged that the pressed key involves secret information (YES in S13), the voice information generator section 29 generates voice information with secrecy (S14). In this case, the voice information generator section 29 generates a very small volume of voice information or voice information converted into a voice of a code or a character set by the user. Here, the code and the character cannot be understood by others even if they are heard by the others. Meanwhile, if the judging section 30 judged that the pressed key does not involve any secret information (NO in S13), the voice information generator section 29 generates normal voice information (S16). That is, the voice information generator section 29 generates voice information the volume of which is such a degree that only an operating user in front of the operation section 13 can hear the voice. Then, using the multifunctional peripheral network communications section 18, the generated voice information is transmitted to the portable terminal device 31 that is owned by the user (S15).

Figure 6:
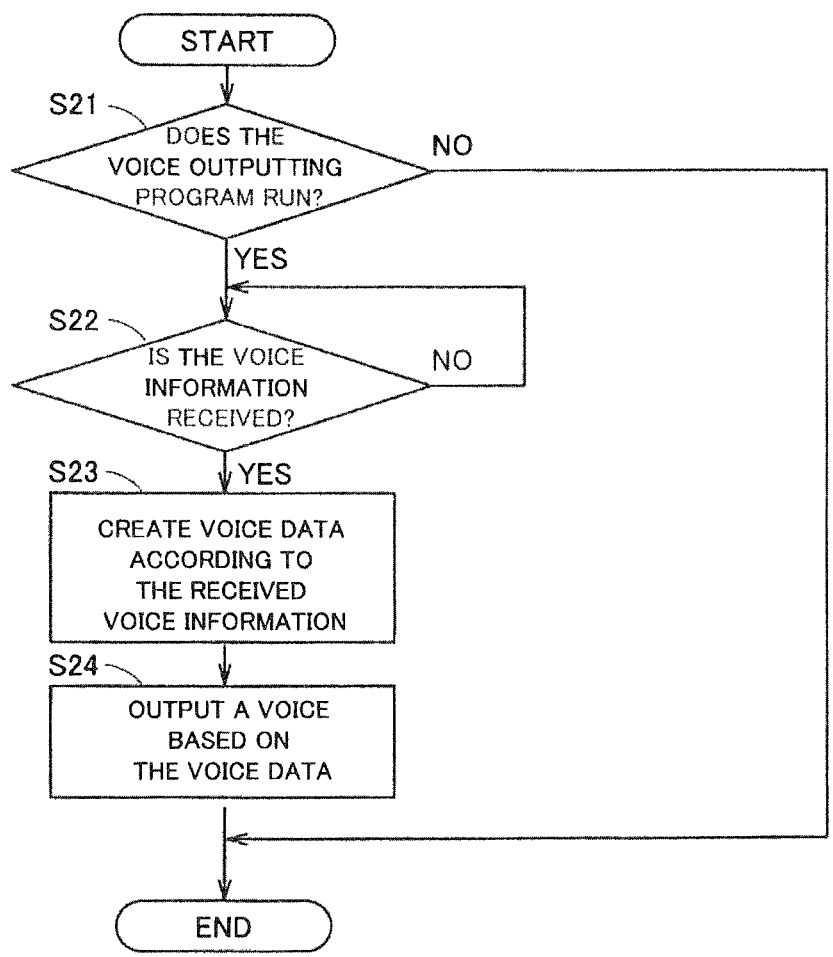
FIG. 6 is a flow chart illustrating a processing flow on the side of a portable terminal device when a user inputs a condition for image formation from the touch panel.

The voice information is transmitted from the side of the multifunction peripheral 11 to the side of the portable terminal device 31 that is owned by the user. FIG. 6 is a flow chart illustrating a processing flow on the side of the portable terminal device 31 when a user inputs a condition for image formation from the touch panel 21.

Referring to FIG. 6, whether or not a voice outputting program runs is first judged (S21) in the portable terminal device 31. If the voice outputting program runs (YES in S21), then whether or not voice information from the side of the multifunction peripheral 11 is received is judged (S22).

If the voice information is received (YES in S22), voice data are created according to the received voice information (S23). In this case, if voice information involving secret information is received, voice data with secrecy are created with the aid of the volume controller section 40. On the contrary, if voice information involving no secret information is received, voice data without secrecy are created.

Then, using the created voice data, a voice is output from the voice outputting section 35 that is installed in the portable terminal device 31 (S24). That is, the portable terminal device 31 guides the user to the position to be pressed and the like by a voice. These processing is performed in real time. That is, these processing is performed during several seconds after the user pressed the touch panel 21.

According to such an image forming system 27, voice information about the pressed position and softkeys 42a-42d detected by the detector section 28 is formed, and is transmitted to the portable terminal device 31. Then, based on the voice information, voice data are created in the voice data creator section 36 installed in the portable terminal device 31 which receives the voice information, and are output as a voice from the voice outputting section 35. In this case, the pressed position in the softkeys 42a-42d is transmitted to the portable terminal device 31 as voice information. The portable terminal device 31 receives the voice information, and the voice information is output as a voice from the voice outputting section 35 in the portable terminal device 31. Thus, the pressed position can be identified by the voice even when the pressed position in the softkeys 42a-42d is unidentified by the eye. In this case, the information is output as a voice using the voice outputting section 35 installed in the portable terminal device 31. Thus, it is not necessary to provide any voice outputting section in the multifunction peripheral 11 itself. Therefore, such an image forming system 27 can simplify the configuration of devices, and makes it easier to input the contents of operations.

In this case, the security can be enhanced because the voice information is generated and then the voice data are created by judging the presence or absence of secret information.

In the above embodiment, a plurality of voice patterns are stored in the portable terminal device storage section 34. However, embodiments may be performed in another way. Alternatively, a voice to be output may be created by combining some types of voices.

In the above embodiment, voice information is generated and then voice data are created by judging the presence or absence of secret information. However, embodiments of this disclosure may be performed in another way. For example, the following configuration may be adopted, in which the judging section 30 is omitted, and voice data that cannot be heard by others or cannot be understood even if it is heard by others may be created regardless of the presence or absence of secret information.

The multifunction peripheral 11 may be configured to detect an input of a pressed key in the softkeys 42a-42d by the detector section 28 when second pressing is detected within a predetermined time after the key in the softkeys 42a-42d is first pressed. Thus, the operation is further simplified.

In the above embodiment, information concerning the pressed position in the softkeys 42a-42d is output by voice. However, embodiments may be performed in another way. Alternatively, a voice to teach the name of each of the softkeys 42a-42d or to guide the contents of operations may be output. Thus, the operability of a user can be further improved.

The embodiments described above are to be considered in all aspects as illustrative only and not restrictive in any manner. The scope of this disclosure is defined not by the explanation described above, but by claims. All changes which come within the meaning and range of equivalency of the claims are to be embraced within the scope of the present disclosure.

The image forming system according to the present disclosure can be particularly effectively used when simplification of the configuration of devices and simplification of inputting the contents of operations are required.

What is claimed is:

1. An image forming system, comprising:
   an image forming device equipped with an image forming section to form an image, and
   a portable terminal device that is communicably connectable to the image forming device,
   the image forming device including
   a touch panel that displays a softkey,
   a detector section that detects a pressed position in the touch panel displaying the softkey,
   a voice information generator section that generates a voice information concerning the position detected by the detector section and the softkey,
   a transmitter section that transmits the voice information generated by the voice information generator section to the portable terminal device, and
   a judging section that judges whether or not the softkey corresponding to the position detected by the detector section involves secret information,
   the portable terminal device including
   a receiver section that receives the voice information transmitted by the transmitter section,
   a voice data creator section that creates voice data to be output based on the voice information received by the receiver section, and
   a voice outputting section that outputs a voice based on the voice data created by the voice data creator section, and
   a portable terminal device storage section that stores a plurality of voice patterns, wherein
   the voice data creator section creates voice data based on a plurality of the voice patterns stored in the portable terminal device storage section,
   the voice outputting section outputs a voice to guide the pressed position,
   the image forming device detects, at the position detected by the detector section, an input of a pressed softkey corresponding to the position when second pressing is detected within a predetermined time after the key is first pressed, and
   if the judging section judged that a softkey corresponding to the pressed position involves secret information, the voice information generator section generates voice information with secrecy, wherein the voice information with secrecy is a very small volume of voice information or voice information converted into a voice of a code or a character set by the user.

2. The image forming system according to claim 1, wherein
   the portable terminal device comprises a volume controller section that controls the volume of a voice output from the voice outputting section.

* * * * *